Nov. 10, 1970         K. KOSKINEN         3,538,734
TOOL FOR FORMING EXTERNAL COLLAR AT A
SIDE OPENING IN A PIPE
Filed Jan. 22, 1968                             2 Sheets-Sheet 1
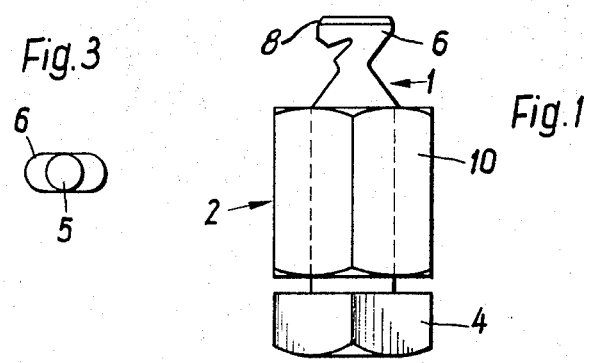
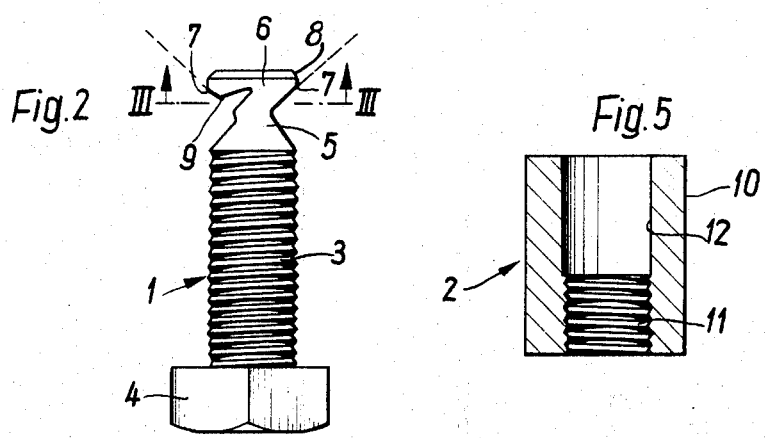
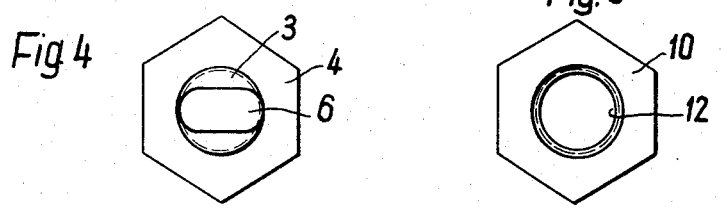
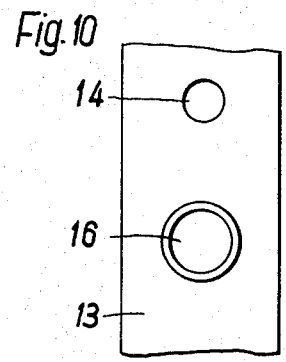
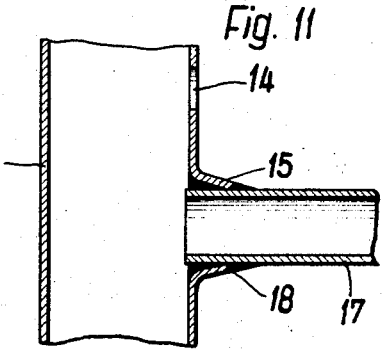
Inventor:
KAUNO KOSKINEN
BY Burmeister, Kulie
Southard + Bodula Nov. 10, 1970     K. KOSKINEN     3,538,734
TOOL FOR FORMING EXTERNAL COLLAR AT A
SIDE OPENING IN A PIPE
Filed Jan. 22, 1968     2 Sheets-Sheet 2

Inventor:
KAUNO KOSKINEN
BY Burmeister, Kulie
Southard & Gadula

United States Patent Office 3,538,734
Patented Nov. 10, 1970

3,538,734
TOOL FOR FORMING EXTERNAL COLLAR AT A SIDE OPENING IN A PIPE
Kauno Koskinen, Hartola, Finland
Filed Jan. 22, 1968, Ser. No. 699,424
Claims priority, application Finland, Jan. 26, 1967, 219/67
Int. Cl. B21d 41/02
U.S. Cl. 72—316        7 Claims

ABSTRACT OF THE DISCLOSURE

Tool for forming an external collar at a side opening in a pipe. The tool comprises an inner part having an external thread and an expansion head at one end, and also an outer part having an internal thread engaging the external thread on the inner part. The expansion head is specially shaped to enable it to be slipped through the side opening into the pipe. Adjustment of one part of the tool with respect to the other forces the expansion head out the side of the pipe. As a consequence, the expansion head expands the material of the pipe around the side opening so as to form an external collar at the opening.

---

The invention relates to a tool for shaping a main pipe, particularly copper, to enable it to be joined to a branch pipe.

The tool comprises a threaded part with an expansion head and a counter part having threaded engagement with the threaded part. The expansion head is adapted to be inserted through a side opening in the main pipe and pulled out the side opening so as to expand the same and form an external collar into which the branch pipe can be fitted and attached by soldering.

Figure 7:
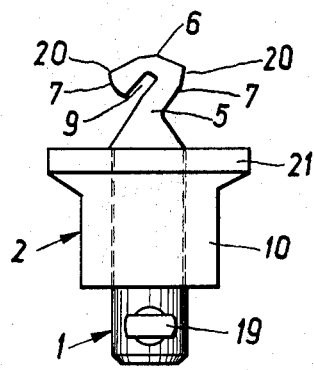
Figure 8:
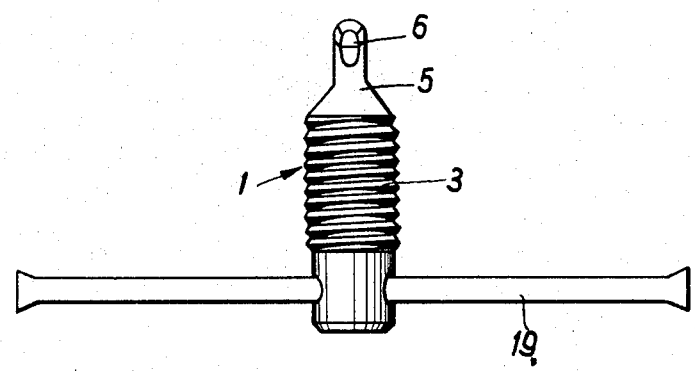
Figure 9:
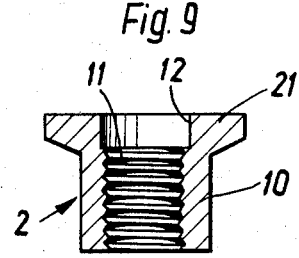

The invention is described below further with the aid of two working examples and the enclosed drawings, in which FIG. 1 presents from the side a tool according to a first mode of applying the invention, FIG. 2 presents from the side the threaded part of the tool according to FIG. 1 provided with expansion head, FIG. 3 presents a section taken over the line III–III in FIG. 2 in the direction of the arrow, FIG. 4 presents from above a threaded part according to FIG. 2, FIG. 5 presents a longitudinal section of the counter part functioning together with the threaded part according to FIGS. 2–4, FIG. 6 presents from above a counter part according to FIG. 5, FIG. 7 presents from the side a tool according to a second mode of applying the invention, FIG. 8 presents from the side the threaded part, of the tool according to FIG. 7 provided with expansion head, seen at right angles to the plane of the figures, FIG. 9 presents a longitudinal section of the counter-part functioning together with the threaded part according to FIG. 8, FIG. 10 presents from the side a pipe showing in its upper part a hole premade, and in its lower part a collar hole expanded from the beforementioned hole by means of the tool according to the inventions, and FIG. 11 presents a longitudinal section of the pipe according to FIG. 10, at which in addition a branch pipe is joined to the expanded collar hole.

The tool according to FIGS. 1–6 comprises a threaded part 1 provided with outer thread, as well as a counter part 2 provided with inner thread functioning together with the former part.

The threaded part 1 comprises a bolt with threads 3 and a noncircular end 4. The end of the threaded part opposite to the head is conically thinned to a neck-portion 5, extending to an expansion head 6. Seen from the end the sides and the corners of the expansion head have the shape of a rounded rectangle as FIG. 3 indicates. The maximum width of the expansion head 6 chiefly corresponds to the diameter of the neck-portion 5 and is smaller than the diameter of the hole to be expanded, and its length is the same as the diameter of the expanded collar hole as seen further below. On those two opposite sides which are located at the ends of the expansion head the neck-portion 5 joins the expansion head over curved and plane expansion surfaces 7. These surfaces are convex outwards and symmetrical with respect to the plane going through the longitudinal axis of the threaded part across the expansion head, at which the extensions of the curved expansion surfaces 7 presented with dotted lines form equal angles with the longitudinal axis of the threaded part 1. The corners between the plane end surface and the side surface of the expansion head 6 are beveled or rounded off at points 8 as shown in FIGS. 1 and 2. In order to be able to fit or slip the expansion head 6 into a hole smaller than its own length or its largest dimension, a gap 9 according to FIGS. 1 and 2 is provided at the point where the neck-portion 5 and the expansion head meet. This begins at that edge of the neck-portion 5 which is located at one end of the expansion head and then continues obliquely in the longitudinal direction of the expansion head towards its end surface, reaching so near the longitudinal axis of the threaded part 1, that the shortest distance between the bottom of the gap and the oppositely located expansion surface 7 at least is not larger than the width of the expansion head. The outer end of the gap is preferably wider and narrows down inwards in such a way, that the pipe wall provided with the hole to be expanded fits in. The bottom of the gap 9 may be convex also outwards.

The counter part 2 functioning together with the threaded part 1 of the tool according to the invention presented in FIGS. 1–4 comprises a sleeve 10 with nutlike outer surface, provided at one end with inner thread 11 and at the other end with a smooth-surface boring 12. The diameter of this boring is larger than the length of the expansion head 6, so that spaces remain between the ends of the expansion head and the surface of the boring 12. The size of these spaces is smaller than the wall thickness of that pipe where the provided hole is to be enlarged for the purpose further described below.

In the mode of application according to FIGS. 7–9 corresponding parts are designated by the same symbols as in FIGS. 1–6.

A rod 19 is provided which is able to be moved longitudinally in a hole running across the threaded part of the tool according to FIGS. 7–9, provided with outer thread 3, at the end opposite to the expansion head 6, the ends of which rod are flattened or otherwise made in such a way, that it is unable to slip out from its hole. This rod, replaceable by a handle or the like, is intended for turning the threaded part 1 and corresponds to the end 4 in the mode of application according to FIGS. 1, 2 and 4. According to FIGS. 7 and 8 the expansion surfaces 7 of the expansion head 6 are straight or plane and the end surface of the expansion head is convex. Furthermore, the expansion surfaces 7 unite with the end surface by means of the plane surfaces 20, which in the case presented form a sharp angle with the longitudinal axis of the threaded part 1, the point of which angle is directed towards that end of the threaded part which is provided with the rod 19.

According to FIGS. 7 and 9 the outer surface of the counter part or sleeve 10 with nutlike outer surface presented in FIGS. 1, 5 and 6 is replaced by a sleeve 10 with cylindrical outer surface, having at the expansion head end a flange 21 for resting against the tube. In addition the smooth-surface boring 12 is of lesser depth than in the first mode of application.

In order to use the tool according to the invention this is assembled by turning the counter part 2 so far over the threads 3 of the threaded part 1 that the expansion head 6 sticks out from the end of the sleeve as shown in FIGS. 1 and 7. When according to FIG. 10 a hole 14 is bored into the waterpipe 13 of copper already installed in its place, the expansion head 6 is slipped into it in such a manner, that the edge of the hole enters into the gap 9, upon which the expansion head by inclining the tool is pushed into the pipe 13 and is kept at right angles to the pipe. Thereafter the end edge of the sleeve 10 or flange 21 of the counter part is pressed against the outer surface of the pipe, the sleeve 10 is prevented from rotating, and the end 4 or the rod 19 is turned in such a way that the expansion surfaces 7 of the expansion head 6 rest against the inside surface of the pipe 13. Rotation of the nutlike counter part 2 or the sleeve 10 may be prevented, for instance, by a monkey wrench, whereas rotation of the counter part according to FIGS. 7 and 9 is prevented by the flange 21 pressing against the pipe 13.

The head 4 of the threaded part 1 according to FIGS. 1, 2 and 4 can be turned by means of a suitable working tool, whereas the threaded part according to FIGS. 7 and 8 is turned with the aid of the rod 19, in order to draw the expansion head 6 out from the pipe 13. Now the expansion surfaces 7 of the expansion head while turning force the wall material of the pipe 13 around the hole 14 out by stretching, at which in the ring-shaped space between the surface of the counter part boring 12 and the expansion head 6 the pipe material forms a collar 15, which becomes thinner and continues outwards until the expansion head 6 is entirely reaching out from the pipe 13. Now the outer edge of the collar 15 in the sleeve according to FIG. 9 will rest against the shoulder of the boring 12 and in this way form a plane surface at right angles with the longitudinal axis of the collar. Thus a larger collar opening 16 is formed in the pipe with a diameter about equal to the outer diameter of the branch pipe 17. When the branch pipe 17 end is fitted into the collar opening 16 it is soldered rigidly to the pipe 13. In this operation the solder 18 is spreading over the collar 15 where this and the branch pipe 17 meet and further between the inside surface of the collar 15 and the branch pipe 17, and possibly somewhat over the inside surface of the pipe 13 about the end of the branch pipe, as well as over the outside surface of the pipe 13 about the collar 15. Thus a completely tight so-called capillary joint is formed. In making a collar opening 16 in the above-mentioned manner, the edge of the sleeve 10 and the edge of the flange 21, and the inner surface of its boring 12 serve as counter part, so that a collar with even outer surface and completely round cross section is obtained. In the case of copper tubes the solder used may consist of, for instance, phosphate of copper or silver. In using the tool according to the invention the diameter ratio between the premade hole 14 in the pipe 13 to be branched off and the expanded collar opening 16 may vary within very large limits. Furthermore, it is possible to make a collar opening in the pipe to be branched, with a diameter equalling the outer diameter of the pipe, i.e., the diameters of the pipe to be branched and the branch tube may be the same. It is clear that for each branch pipe 17 diameter a tool has to be made provided with an expansion head 6 of a size corresponding to it.

Naturally, the invention is not limited to the above presented mode of application, but may be varied considerably within the scope of the patent claims as to details. This concerns in particular the shape of the expansion head and its gap, as well as the expansion surfaces, and the corresponding angle formed with the longitudinal axis of the tool. Likewise the counter part may be provided with an arm or the like connected to it, in order to prevent this part from turning in expanding the hole. For preventing turning of the counter part it may be provided also with suitable organs catching about the pipe to be branched, e.g., with jaws or the like adjustable according to the diameter of the tube. The shape of the surface of the counter part resting against the pipe may also vary in the direction of the longitudinal axis of this part, and at right angles to it.

I claim:

1. Tool for expanding material of a pipe around a side opening therein to form on the pipe an external collar into which the end of a branch pipe can be inserted and attached by soldering, said tool comprising a threaded part having at one end an expansion head joined to the balance of the threaded part by a reduced neck, the width of the expansion head considered at right angles to the axis of the threaded part being less than the diameter of said side opening in the pipe, the length of the expansion head considered at right angles to the axis of the threaded part being greater than said width and about equal to the inner diameter of the collar to be formed on the pipe and the outer diameter of the end of the branch pipe to be inserted in the collar, the threaded part having a gap formed at the juncture of the reduced neck and the expansion head, the gap being of such depth as to enable the expansion head to be inserted through the hole into the pipe, the tool further comprising a counter part having threaded engagement with the threaded part and being engageable with the pipe so as to cause rotation of the threaded part and counter part with respect to one another to pull the threaded part out through the side opening in the pipe.

2. A tool as specified in claim 1, the transverse side surfaces of the expansion head being joined to the neck along expansion surfaces symmetrical with respect to the longitudinal axis of the threaded part.

3. A tool as specified in claim 2, the edges of the expansion head end surface and all side surfaces being rounded.

4. A tool as specified in claim 2, the edges of the expansion head end surface and all side surfaces being beveled.

5. A tool as specified in claim 2, the gap in the threaded part extending obliquely toward the longitudinal axis thereof and toward the end surface thereof, the width of the gap decreasing from its outer end to its bottom.

6. A tool as specified in claim 1, the end of the threaded part opposite the expansion head being noncircular for turning of the expansion head.

7. A tool as specified in claim 1, the end of the threaded part opposite the expansion head being provided with a rod or handle for turning of the expansion head.

References Cited

UNITED STATES PATENTS

| 2,670,224 | 2/1954 | Markl | 29—157 |
| 2,787,050 | 4/1957 | Markl | 29—157 |
| 2,290,965 | 7/1942 | Hodapp et al. | 29—157 |

CHARLES W. LANHAM, Primary Examiner

M. J. KEENAN, Assistant Examiner

U.S. Cl. X.R.

29—157